US006646599B1

(12) United States Patent
Apa et al.

(10) Patent No.: US 6,646,599 B1

(45) Date of Patent: Nov. 11, 2003

(54) OPEN LOOP ARRAY ANTENNA BEAM STEERING ARCHITECTURE

(75) Inventors: Martin J. Apa, Wayne, NJ (US); Joseph Cikalo, Nutley, NJ (US); William L. High, New York, NY (US); Mitchell J. Sparrow, Wayne, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/097,408

(22) Filed: Mar. 15, 2002

(51) Int. Cl.[7] .......................... H01Q 21/06; H01Q 3/26; H04K 3/00; G01S 13/00

(52) U.S. Cl. .......................... 342/361; 342/14; 342/188; 342/368

(58) Field of Search .......................... 342/14, 188, 361, 342/368

(56) References Cited

U.S. PATENT DOCUMENTS 4,456,913 A * 6/1984 Rao et al. .................. 342/361
4,772,893 A 9/1988 Iwasaki
4,937,582 A 6/1990 Mohuchy
5,206,655 A * 4/1993 Caille et al. ................ 342/361
5,276,455 A * 1/1994 Fitzsimmons et al. ...... 342/368
5,412,414 A * 5/1995 Ast et al. .................... 342/372
5,504,493 A 4/1996 Hirshfield
5,661,489 A 8/1997 Baker
5,771,016 A 6/1998 Mullins et al.
5,923,289 A * 7/1999 Buer et al. .................. 342/368
6,175,326 B1 1/2001 Kare

OTHER PUBLICATIONS

GaAs MMIC phase shifters for phased arrays, A.A. Lane, IEE Colloquium on Solid State Components for Radar, p. 3/1–3/5, Fe 1988.*

Phased arrays–part II: implementations, applications, and future trends, D. Parker et al., IEEE Transactions on Microwave Theory and Techniques, vol. 50(3), p. 688–698, Mar. 2002.*

* cited by examiner

*Primary Examiner*—Thomas H. Tarcza
*Assistant Examiner*—Fred H. Mull
(74) *Attorney, Agent, or Firm*—Hunton & Williams

(57) ABSTRACT

A solid state active aperture high power polarization agile transmitter, either single or dual polarization, employing nonreciprocal antenna elements, designed such that it can be used in an Electronic Warfare (EW) system that is more efficient and less expensive. Antenna beam steering is accomplished with variable phase shifters that are used to set the RF signal phase of each element. The beam steering function is implemented with a hardware architecture where the phase shifters are built-in ahead of the power amplifiers such that these low power phase shifters impart phase delays to low power signals without wasting RF signal power and hence improving efficiency. These power transmitter devices are also more reliable, lighter in weight and smaller in size.

25 Claims, 4 Drawing Sheets

OPEN LOOP ARRAY ANTENNA BEAM STEERING ARCHITECTURE

FIELD OF THE INVENTION

The present invention relates generally to radar systems and Electronic Warfare (EW) systems, and in particular, to high power transmitters used in these systems.

RELATED APPLICATIONS

This application is related by subject-matter to the application entitled "Efficient Beam Steering For Closed Loop Polarization Agile Transmitter" , Ser. No. 10/052,522, filed in the name of inventors Martin J. Apa, Joseph Cikalo, William L. High, and Mitchell J. Sparrow.

BACKGROUND OF THE INVENTION to Electronic Warfare (EW) generally relates to any military action involving the use of electromagnetic and directed energy to control the electromagnetic spectrum or to attack the enemy. The three major subdivisions within EW are Electronic Attack, Electronic Protection and Electronic Support. Electronic Attack (EA) is the division of EW involving the use of electromagnetic or directed energy to attack personnel, facilities or equipment with the intent of degrading, neutralizing or destroying enemy combat capability. Transmitters used for an EW system should be small in size, low in weight, and able to carry many watts/cubic inch. In addition, there is often a need in EW systems for a higher power transmitter that is also polarization agile.

One objective of an EW system may be to produce a jamming signal (e.g. false targets) in threat radar receiver that is much greater in amplitude than that of the radar signal reflected by the target aircraft, with the appropriate polarization. The availability of advanced power amplification technologies makes it possible to develop high power transmitters with the above characteristics.

The basic architecture of such a transmitter is an active aperture antenna consisting of a large number of elements. Though the output power of each antenna element is a relatively low level, a high power Radio Frequency (RF) signal is obtained by combining the individual signals in space. To attain the highest power levels, a phase focusing technique is employed. Each element is tuned to produce a signal with the appropriate phase in order to spatially combine. However, phase focusing also produces a narrow beam antenna. Consequently, a beam steering network is used in order to radiate the maximum transmitted signal in a desired direction. Generally, a beam steering network may comprise a network of variable phase shifters, time delay elements, or fiber optic delays, with an external processor and drivers to adjust them.

According to the conventional approach, the phase shifters are inserted at the output terminal of the system's power amplifiers, just prior to feeding the RF radiators (antenna module). A significant drawback of this architecture is that a large amount of RF power is dissipated in the phase shifters placed after the power amplifiers. This reduces the efficiency of the system and may require the use of additional cooling system capability. Moreover, dissipation of a large amount of RF power in such architecture generally requires use of large, less reliable high power phase shifters that must be capable of handling high RF power levels. The requirement for large size phase shifters makes such transmitter systems used in EW equipment more bulky, less accurate, and less agile. These are significant drawbacks of the prior art.

Other problems and drawbacks also exist.

SUMMARY OF THE INVENTION

An embodiment of the present invention comprises a polarization control module and a polarization agile transmitter. The polarization agile transmitter includes a plurality of beam steering phase shifters, a plurality of power amplifier modules and a plurality of dual polarization radiators, where the beam steering phase shifters are located before the power amplifier modules.

According to another aspect of the invention the polarization control module has a receive polarimeter for determining the polarization parameters of the incoming RF signal and a transmit polarimeter for controlling the polarization parameters of transmitted RF signal.

According to yet another aspect of the invention, a receiver is provided to provide a signal base for the polarization agile transmitter.

According to another aspect of the invention, the output signal from the polarization control module is input to the plurality of beam steering phase shifters that comprises a beam steering network placed before the power amplification modules.

Accordingly, it is one object of the present invention to overcome one or more of the aforementioned and other limitations of existing systems for antenna beam steering.

It is another object of the present invention to provide an efficient system for antenna beam steering using low power phase shifters.

It is yet another object of the present invention to provide a system for antenna beam steering that solves or mitigates the problems associated with the requirement of high power beam steering phase shifters.

It is another object of the present invention to provide a system for antenna beam steering that is smaller, lighter and more reliable.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objectives and other advantages of the invention will be realized and attained by the systems and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which.

To facilitate understanding, identical reference numerals have been used to denote identical elements common to the figures.

DETAILED DESCRIPTION OF THE INVENTION

Figure 1:
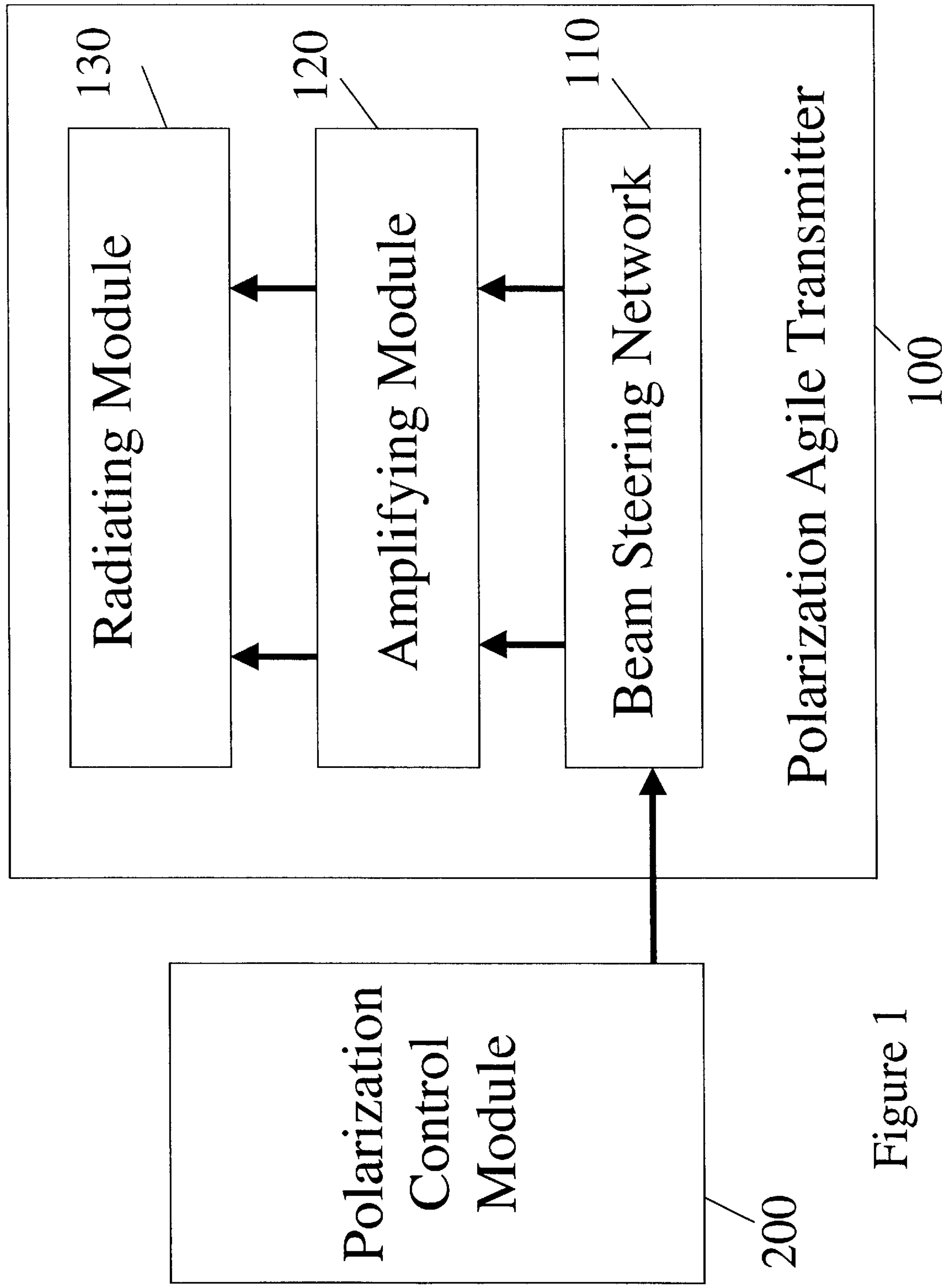
FIG. 1 is a block diagram of a portion of an EW system according to an embodiment of the invention.

FIG. 1 is a block diagram of an EW subsystem according to an embodiment of the invention. The subsystem in FIG. 1 comprises polarization agile transmitter 100 and polarization control module 200. According to an embodiment of the invention, the polarization agile transmitter 100 comprises a beam steering network 110, amplifying module 120, and radiating module 130.

As shown in FIG. 1, beam steering network 110 is located prior to amplifying module 120. In other words, the output of beam steering network 110 is an input to amplifying module 120. The output of amplifying module 120 is fed as the input to radiating module 130.

Generally, the operation of the system of FIG. 1 is as follows. The polarization control module 200 provides a signal base input to the polarization agile transmitter 100. According to one approach, the signal base represents the received radar signal as modified to reflect an appropriate phase change and any other appropriate modifications (e.g., amplitude, duration, frequency, etc.). Typically, the signal base is the received radar signal as modified by including a 180° phase shift. Alternatively, the signal base could be based on a previously stored signal retrieved from a memory. The signal base is input to the polarization agile transmitter 100 from the polarization control module 200. The beam steering network 110 controls the direction of the beam to so that it is directed in the direction of the threat radar system. The amplifying module 120 amplifies the signal output from the beam steering network 110. The amplified signal is fed to the radiating module 130 that transmits the signal to the threat radar.

This is an open loop implementation of polarization agile transmitter 100. The beam steering network 110 receives the information regarding the desired direction of the output beam from polarization control module 200. In this embodiment the direction of the output beam transmitted from the radiating module 130 is not compared with the signal input into the beam steering network 110. This open loop approach without a feedback comparison of the transmitted signal to the input signal base can be implemented relatively inexpensively and with greater reliability than can be a closed loop approach.

Figure 2:
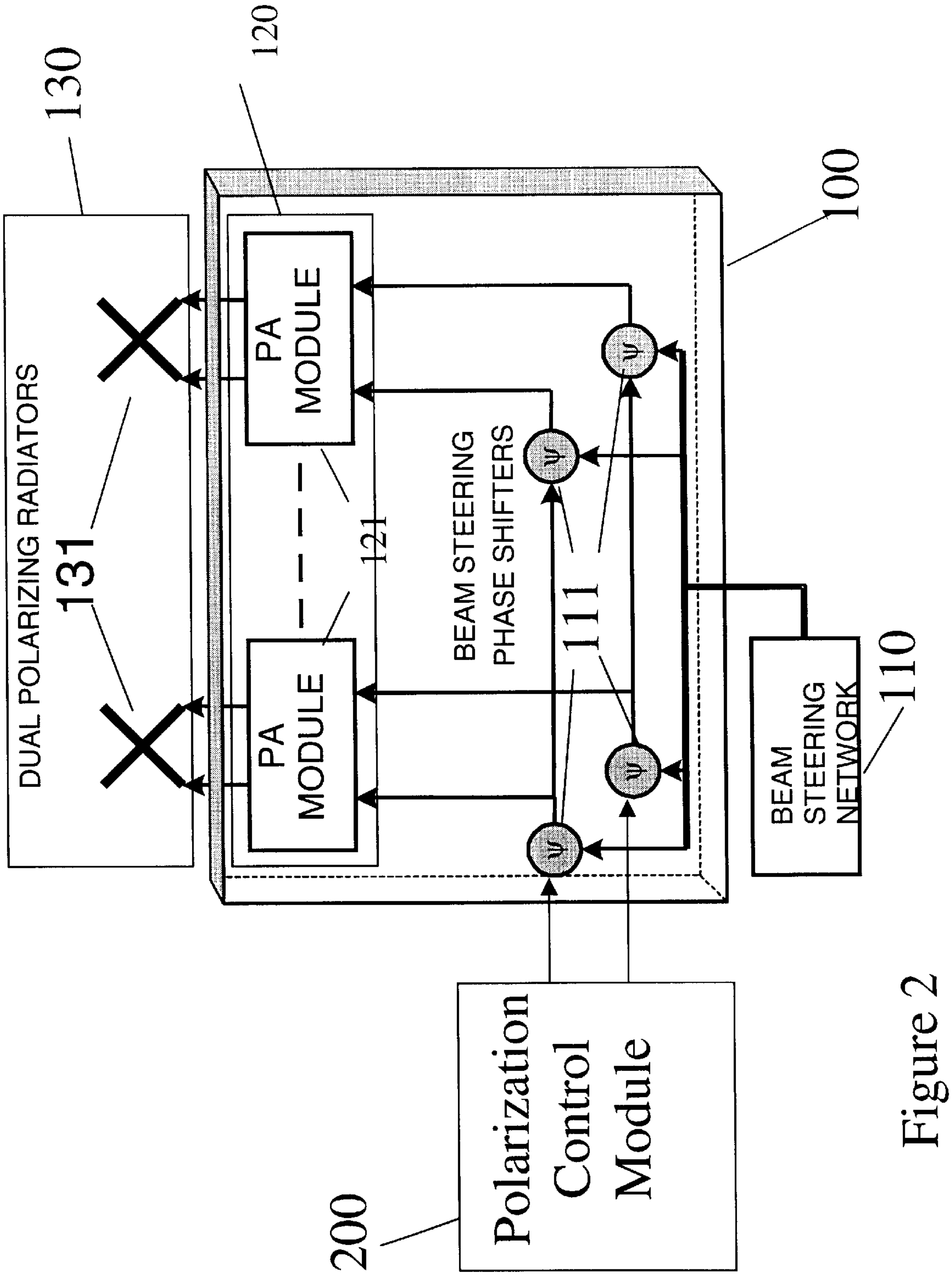
FIG. 2 is a block diagram of the design of an antenna beam steering system according to an embodiment of the invention.
Figure 4:
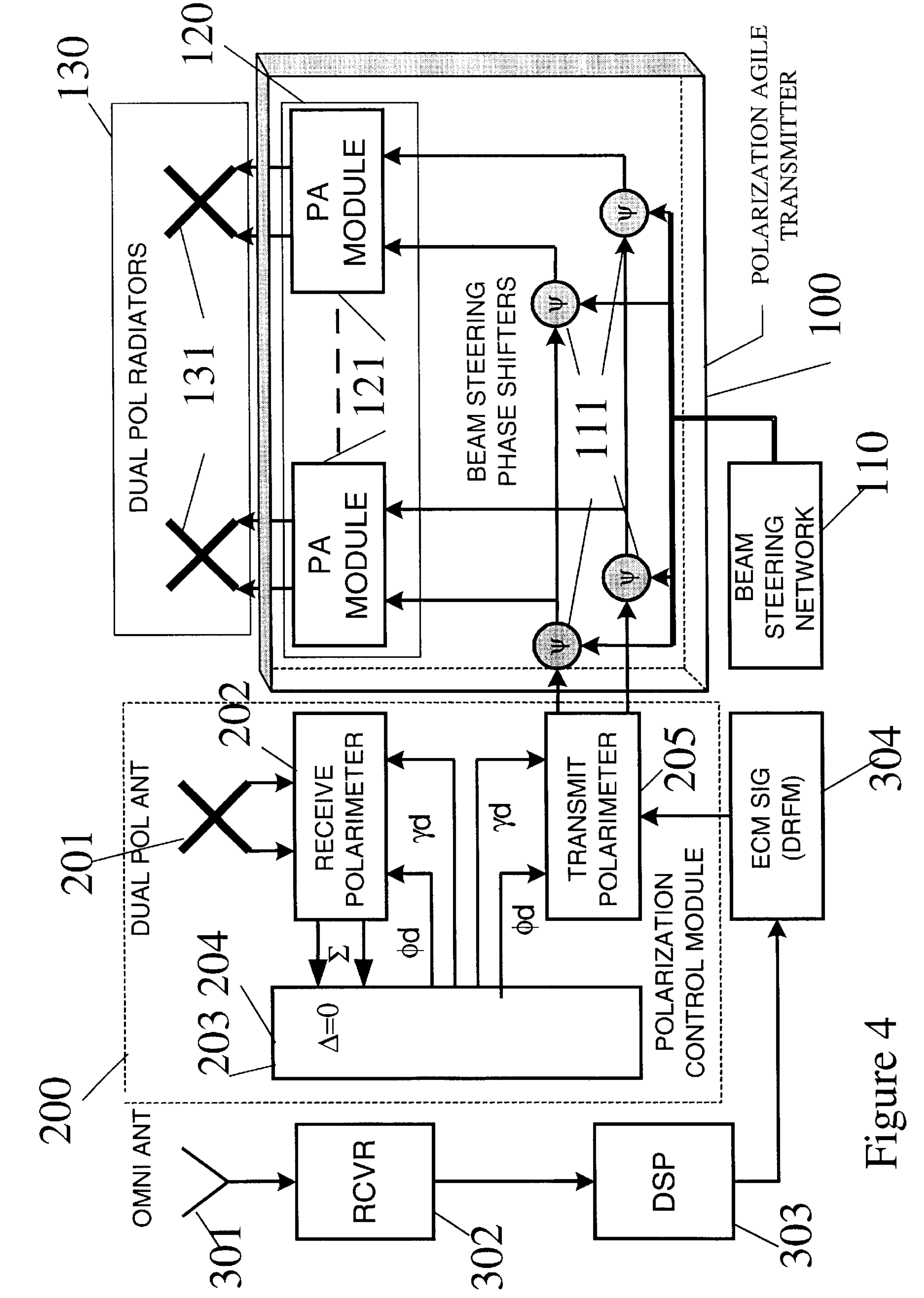
FIG. 4 is a block diagram of an EW subsystem according to an embodiment of the invention.

FIG. 2 is a block diagram of an EW subsystem according to a further embodiment of the invention. According to FIG. 2, the beam steering network 110 is comprised of a number of beam steering phase shifters 111. Amplifying module 120 is comprised of a number of power amplifier modules 121. The radiating module 130 is comprised of a number of polarizing radiator elements 131. (Note: FIGS. 2 and 4 illustrate an n=2 system with two modules of the present invention and two dual polarizing antennas; however, various numbers of modules could be used, such as for n=2, 3, and so forth.)

Generally, the signal to be transmitted to the threat radar system is input to the polarization agile transmitter 100 from the polarization control module 200. The input signal to the beam steering network 110 is passed through the n beam steering phase shifters 111 so that the antenna beam can be focused in a given direction. The signal output from the phase shifters 111 is input to the power amplifiers 121. The power amplifiers 121 amplify the signal. The amplified signal output from the power amplifiers 121 is fed to dual polarizing radiator elements 131 to be transmitted to the threat radar.

The RF input signal to the variable beam steering phase shifters 111 traverses the n phase shifters to delay the output signal of the n-th module by $n\omega$, where $n\omega$ is the phase shift effected by the n-th phase shifter. Preferably, the RF signal should be fed in parallel to all phase shifting modules 111.

According to this embodiment, the output signal phase of antenna radiator elements 131 has two components: the set-on phase shifter phase ($n\omega$) and a phase error ($\delta\phi_n$), a phase error of the n-th power amplifier. The composite phase value of this radiator element output is not dependent on the phase shifter's location in relation to the power amplifier's location in the circuit feeding to the radiator element. Hence, placing the phase shifters 111 before the power amplifier modules 121 does not adversely affect the phase error of the output signal phase.

The beam steering phase shifters 111 used in the polarization agile transmitter 100 may comprise loaded line phase shifters, switched line phase shifters, hybrid-coupled phase shifters, or any other suitable device used for phase shifting. Generally, phase shifters 111 may comprise variable phase shifters, time delay elements, or fiber optic delays. Beam steering phase shifters 111 may comprise any of the various types of phase shifters available such as transistor/diode phase shifters, FET phase shifters, GaAs monolithic microwave integrated circuit (MMIC) phase shifters, or other equivalent phase shifters. In one embodiment of the invention, low power and low cost GaAs MMIC phase shifters 111 are used.

The power amplifier modules 121 are made up of power amplifiers that boost the output power of the signal's orthogonal polarization components. For example, power amplification modules 121 may comprise a pair of power modules that boost the output power of the signal's orthogonal polarization components. In one embodiment of the invention, the power amplifiers make use of advanced power amplification technologies that use a GaAs, GaN, SiC, InGaN, AlGaN MMIC chip, or Microwave Power Modules (MPM) technology. Selection of suitable power amplifiers for power amplifier modules 121 is well within the skill of the ordinary artisan.

The embodiments of the present invention disclosed in FIG. 1 and FIG. 2 use an efficient design approach that provide advantages over the conventional approach in designing of antenna beam steering systems. It is shown that the beam steering function can be as well instrumented with the phase shifters 111 placed at the input to the power amplifiers 121, as compared to the conventional approach, where the phase shifters are placed at the output of the power amplifier module. Thus, beam steering accuracy achieved by implementing this approach as outlined in FIG. 2 is comparable to that achieved by the traditional approach. The phase error performance in the beam steering function is maintained for the invention as compared to the conventional approach. Additionally, placing the phase shifters 111 before the power amplifier modules 121 allows the power amplifier modules 121 to compensate for any signal attenuation occurring in phase shifters 111. In sum, the performance of the beam steering approach is maintained while providing a number of significant advantages.

For example, the application of phase delays with phase shifters 111 in the disclosed configuration allows for the use of low power MMIC phase shifters. This approach results in increased efficiency derived from the reduction of RF signal power dissipation, greater mean time between failures (MTBF) and lower overall cost for the polarization agile transmitter. These are significant benefits. The skilled artisan will readily appreciate that embodiments of the present invention may be fabricated using technologies which include those in which all components described above can be in analog or in digital chip form and which can be integrated into compact modules. For example, due to reduced RF power dissipation required in the phase shifters 111, one can utilize GaAs MMIC such as coplanar GaAs waveguides. This provides a means for obtaining the advantages of small size and reduced manufacturing costs from these technologies in an ECM system. According to an embodiment of the present invention, magnitude reduction in the range of about 10:1 compared to traditional design can be achieved. In addition, the aspect of the present invention which makes it possible to utilize the solid state technology also makes it practical to utilize these technologies to provide phased array applications which were hitherto prohibitively expensive.

Figure 3:
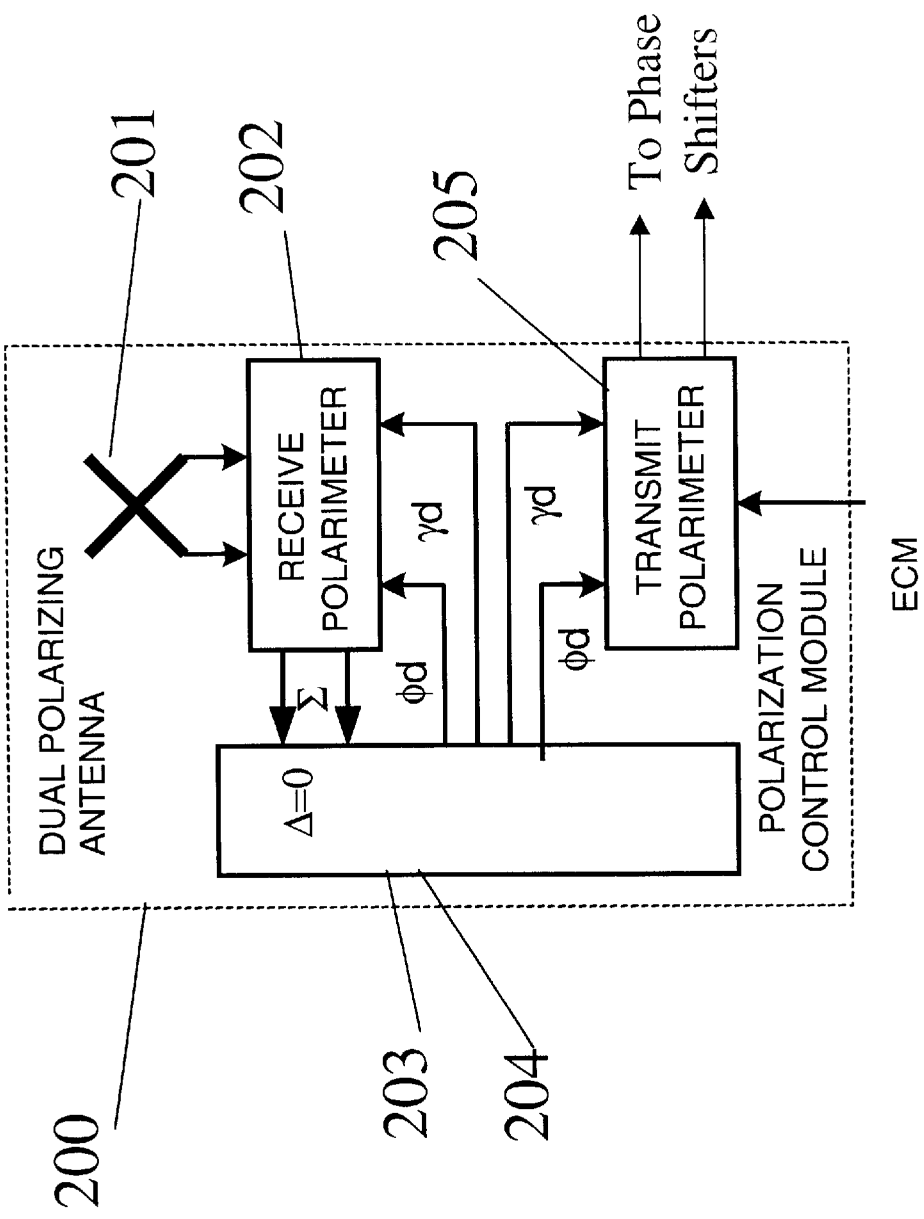
FIG. 3 is a block diagram of a polarization control module according to an embodiment of the invention.

FIG. 3 is a diagram of a preferred embodiment of the polarization control module 200. According to FIG. 3, the polarization control module 200 is used to feed a polarization agile transmitter such as polarization agile transmitter 100 of FIG. 2 in order to control the polarization of the transmitted signal. Polarization control module 200 can be located almost anywhere on the face of the aperture of the antenna. A radar signal intercepted by a dual polarizing array antenna 201 is fed to the polarization control module 200. This single polarization control module 200 can establish and maintain polarization parameter values for the entire array. This module may be comprised of (1) receive polarimeter (RCVRP) 202, (2) a superhet dual channel receiver 203, (3) a null adaptive tracker 204 (that usually includes a DSP) and (4) a transmit polarimeter (XMTRP) 205. The receive polarimeter 202, with the null adaptive tracker 204, measures the polarization of the incoming signal from dual polarizing antenna 201. The signal's polarization state is defined in terms of the ratio of the amplitudes of its polarized components and the phase difference between them under a null condition. The receive polarimeter 202 phase shifters values are used in the derivation of the control signals for the transmit polarimeter 205. According to one approach, values for the transmit polarimeter phase shifters are defined in terms of the receive polarimeter settings by the mathematical relationship as shown by $$\gamma=\pi-\gamma r \text{ and } \phi=\phi r$$

where γr=2Atan(a/b), a is the amplitude of one component and b the amplitude of the second component, and Or is a measure of the phase difference between them. Those of skill in the art will recognize that alternative approaches to deriving the polarization components of the signal, and for deriving the control signals that control the transmit polarimeter, could readily be employed without departing from the true spirit and scope of the present invention.

The transmit polarimeter 205 then sets the amplitude and phase characteristic for the entire dual polarizing array. Further details of an exemplary polarization control module 200 which could be used with the present invention are provided in U.S. Pat. No. 4,937,582 to Mohuchy, incorporated herein by reference in its entirety. The output signal from transmit polarimeter 205 is then fed to the n phase shifters at the inputs of the n power modules (see FIG. 4, phase shifters 111 and PA modules 121).

FIG. 4 is a block diagram of an EW subsystem according to a further embodiment of the invention. In FIG. 4, a receiver 302 is included to provide a signal base for the transmitter. An omni-directional antenna 301 receives the signal from the threat radar and is connected to the receiver 302. The signal received by the receiver 302 is processed in the digital signal processor (DSP) 303. A Digital RF Memory (DRFM) 304 is typically used to retain the radar signal waveform. The stored waveform is subsequently used as the basis to develop Electronic Counter Measure (ECM) signals for countering a specific radar. The stored waveform from the DRFM 304 is input to the polarization control module 200, which operates as described in FIG. 3 to set the amplitude and phase characteristic for the entire dual polarizing array 131 of the polarization agile transmitter 100. The signal output from the polarization control module 205 is input to the polarization agile transmitter 100 which operates as described previously.

As it should be clear to those of ordinary skill in the art, further embodiments of the present invention may be made without departing from its teachings and all such embodiments are considered to be within the spirit of the present invention. For example, although preferred embodiments of the present invention comprises MMIC phase shifters, it should be clear to those of ordinary skill in the art that embodiments of the present invention may be comprised of FET phase shifters as well. Therefore, it is intended that all matter contained in above description or shown in the accompanying drawings shall be interpreted as exemplary and not limiting, and it is contemplated that the appended claims will cover any other such embodiments or modifications as fall within the true scope of the invention.

What is claimed is:

1. An antenna beam steering system, comprising:

a plurality of beam steering phase shifters to delay phase of an RF signal in order to control the direction of transmission;

wherein the plurality of beam steering phase shifters are operatively connected to a polarization control module for controlling the polarization state of the RF signal;

a plurality of power amplifier modules operatively connected to the output of the plurality of beam steering phase shifters so that the RF signal is directionally focused prior to amplification; and a plurality of polarizing radiators operatively connected to the output of the plurality of power amplifier modules.

2. The system of claim 1, wherein the plurality of polarizing radiators comprises dual polarizing radiators.

3. The system of claim 1 further comprising a receiver with dual polarizing radiators for providing a signal base for the polarization control module.

4. The system of claim 1, wherein the plurality of beam steering phase shifters comprises GaAs MMIC type phase shifters.

5. The system of claim 2, wherein the plurality of beam steering phase shifters comprises GaAs MMIC type phase shifters.

6. The system of claim 3, wherein the plurality of beam steering phase shifters comprises GaAs MMIC type phase shifters.

7. The system of claim 1, wherein the plurality of beam steering phase shifters comprise transistor/diode phase shifters or FET phase shifters.

8. An antenna beam steering system, comprising:

a plurality of beam steering phase shifters to delay phase of an RF signal in order to control the direction of transmission;

a plurality of power amplifier modules connected at the output of the plurality of beam steering phase shifters so that the RF signal is directionally focused prior to amplification;

a plurality of dual polarizing radiators connected at the output of the plurality of power amplifiers a polarization control module connected to the input of the plurality of beam steering phase shifters for controlling the polarization state of the RF signal; and a receiver with dual polarizing radiators for providing a signal base for the polarization control module.

9. The system of claim 8, wherein the plurality of beam steering phase shifters comprises GaAs MMIC type phase shifters.

10. The system of claim 8, wherein the plurality of beam steering phase shifters comprise transistor/diode phase shifters or FET phase shifters.

11. A polarization agile transmitter, comprising:

a beam steering network for receiving a signal base and for generating a phase-shifted output of the signal base in order to control the direction of transmission;

wherein the beam steering network is operatively connected to a polarization control module for controlling the polarization state of the signal base;

an amplifying module for amplifying the phase-shifted output; and a radiating module for radiating the amplified phase-shifted output, wherein the amplifying module is located after the beam steering network so that the signal output to be transmitted is directionally focused before amplification.

12. The polarization agile transmitter of claim 11, wherein the beam steering network comprises a plurality of phase shifters.

13. The polarization agile transmitter of claim 12, wherein the plurality of phase shifters comprises GaAs MMIC phase shifters.

14. The polarization agile transmitter of claim 13, wherein the radiating module comprises dual polarizing radiators.

15. The polarization agile transmitter of claim 13, wherein the amplifying module comprises power amplifiers.

16. The system of claim 12, wherein the plurality of phase shifters comprise transistor/diode phase shifters or FET phase shifters.

17. The polarization agile transmitter of claim 11 further comprising a receiver with dual polarizing radiators for providing the signal base to the polarization control module.

18. The polarization agile transmitter of claim 11, wherein the polarization control module comprises a receive polarimeter and a transmit polarimeter.

19. A polarization agile transmitter, comprising:

a beam steering network comprising a plurality of phase shifters for receiving a signal base and for generating a phase-shifted output of the signal base in order to control the direction of transmission;

an amplifying module comprising a plurality of power amplifiers for amplifying the phase-shifted output;

wherein the beam steering network is located prior to the amplifying module such that the signal base is directionally focused prior to amplification;

a radiating module comprising a plurality of dual polarizing radiators for radiating the amplified phase-shifted output; and a polarization control module for providing the signal base with a controlled polarization state for the beam steering network.

20. The polarization agile transmitter of claim 19 wherein the phase shifters are of the GaAs MMIC type.

21. The polarization agile transmitter of claim 19 wherein the polarization control module comprises a receive polarimeter and a transmit polarimeter.

22. The polarization agile transmitter of claim 19, wherein the phase shifters are transistor/diode phase shifters or FET phase shifters.

23. An antenna beam steering system used for generating electronic countermeasure (ECM) signals, comprising:

a polarization agile transmitter including:

(1) a beam steering network comprising a plurality of phase shifters in order to control the direction of transmission;

(2) a plurality of power amplifiers located after the beam steering network;

(3) a plurality of dual polarization antennas for transmitting a signal output having a directional component and polarization components derived based on a received signal base from a threat radar;

a polarization control module including:

(1) a dual polarizing antenna for receiving the signal base;

(2) a receive polarimeter for measuring the polarization of the signal base;

(3) a transmit polarimeter for generating an output to the beam steering network based on the measured polarization; and an omnidirectional antenna for receiving the signal base and providing the signal base to the transmit polarimeter.

24. The antenna beam steering system of claim 23, wherein the polarization control module further comprises a null adaptive tracker for tuning the received signal base.

25. The antenna beam steering system of claim 23 further comprising a memory for storing a signal base received by the omnidirectional antenna.

* * * * *